United States Patent

Johnson et al.

[15] 3,649,081
[45] Mar. 14, 1972

[54] FLUID VIBRATION TRANSPORT SYSTEM

[72] Inventors: Robert Allen Johnson, Greeley, Colo.; Erwin H. Richards, So. Burlington; Roy H. A. Watson, Burlington, both of Vt.

[73] Assignee: International Business Machines Corporation, Armonk, N.Y.

[22] Filed: Jan. 22, 1971

[21] Appl. No.: 108,815

[52] U.S. Cl. .............................................302/2 R, 302/31
[51] Int. Cl. .........................................................B65g 53/00
[58] Field of Search........................302/2 R, 24, 31; 221/278

[56] References Cited

UNITED STATES PATENTS 3,103,850  9/1963  Khoury et al. ...........................302/31
3,314,729  4/1967  Baumeister et al.....................302/2 R Primary Examiner—Richard E. Aegerter
Assistant Examiner—Hadd S. Lane
Attorney—Sughrue, Rothwell, Mion, Zinn & Macpeak

[57] ABSTRACT

An article is moved selectively in either direction along a generally fluid confined transport path by alternately applying vacuum pressure fluid pulses and positive pressure fluid pulses of different amplitude and/or duration, preferably to the same side of the confined article.

16 Claims, 3 Drawing Figures

Patented March 14, 1972

3,649,081

INVENTORS
ROBERT A. JOHNSON
ERWIN H. RICHARDS
ROY H. A. WATSON

Sughrue, Rothwell, Mion,
BY Zinn & Macpeak

ATTORNEYS

FLUID VIBRATION TRANSPORT SYSTEM

BACKGROUND OF THE INVENTION

1. Field of the Invention

This invention is applicable to fluid transport systems and, more particularly, to a method and apparatus for pneumatically conveying articles such as semi-conductor chips and the like during fabrication.

2. Description of the Prior Art

During the fabrication of semi-conductor chips, it is conventional to employ pressurized air to move the chip along a transport tube or similarly fluid confined path. In such transport systems, a high pressure (velocity) air stream is required to overcome chip-breakaway (static) friction. However, after the chip starts to move, the chip velocity is so high that chip damage occurs upon impact at the end of the tube with the processing equipment. If the air pressure (velocity) is reduced to provide a chip velocity in which no damage occurs to the chip at the end of the transport path, there is additionally required mechanical vibration to start the chips moving. In mechanically vibrating the systems, all components including the tube or other confined path defining means are vibrated as are the electrical probes necessary to the processing equipment.

In an attempt to eliminate this problem, transport mechanisms have been provided in which fluid pulses have been applied at longitudinally spaced positions to the chips or other articles being transported, so as to effect a pneumatic vibration and at the same time provide sufficient motive force to move the chips or other articles along the path to the desired extent. One particular prior art pneumatic transport mechanism comprises a plurality of nozzles ranged along opposite sides of the conveying channel with valving facilities pulsating the air through the nozzles to thereby convey the articles along the supporting member. Such mechanisms, however, are relatively complicated, involve the discharge of fluid through a great number of nozzles which must be directed at closely controlled angles at the moving articles and require close control of the pressurized fluid discharge at respective nozzles to effect controlled movement of the article along the transport path. Further, the direction of movement of the article is not reversible, and variation in velocity of movement is relatively hard to achieve or to closely control.

SUMMARY OF THE INVENTION

The present invention is directed to both a method and apparatus for moving an article along a fluid confined transport path comprising the alternate application to the same side of the article, of positive pressure fluid pulses and vacuum pressure fluid pulses to effect vibration transport of the article along the confined path. Thus, the application of a positive pressure fluid pulse to the medium surrounding the article is sufficient to overcome any inertia of the article and impact a momentum vector to the article, while applying an adverse pressure pulse to the article by alternate vacuum application acts to partially impede the first pressure pulse effects. The pressure pulse imparted motion controls the distance of travel, the momentum of the article so moved and in fact the direction of the same by maintaining the amplitude of the two pressures unequal.

One specific fluid transport system involves a common fluid outlet coupled to the confined transport path and individual inlets fluid coupled to the common outlet and extending parallel to the outlet. A disc rotatable about the axis of the common outlet overlies the open end of each inlet and at least one axial opening is carried by the disc at a radial location in line with the inlets. A vacuum source on the side of the disc opposite that of the inlets is axially aligned with one of said inlets, while a positive pressure fluid source is axially aligned with the other inlet. Rotation of the disc and the positioning of the axial openings within the same insures alternate coupling of the vacuum pressure fluid source and the positive pressure fluid source to the common outlet for vibratory movement of the article along the fluid confined path. With the position of the dual inlets set relative to the axis of rotation of the disc, alternate coupling of the vacuum pressure fluid source and the positive pressure fluid source to the outlet is controlled by the proper circumferential spacing of the axial holes relative to the inlets to effect blocking of one inlet while the other inlet is in axial alignment with one of the disc holes. Alternatively, one of the outlets is shiftable circumferentially with respect to the other, along with its axially aligned fluid pressure source to insure alternate blocking and opening of the same through rotation of the disc in an out of phase fashion with respect to the other fluid pressure source and inlet. Preferably, the inlets are spaced 180° from each other and the disc includes a large number of axial holes at circumferentially spaced positions.

DESCRIPTION OF THE PREFERRED EMBODIMENT

Figure 1:
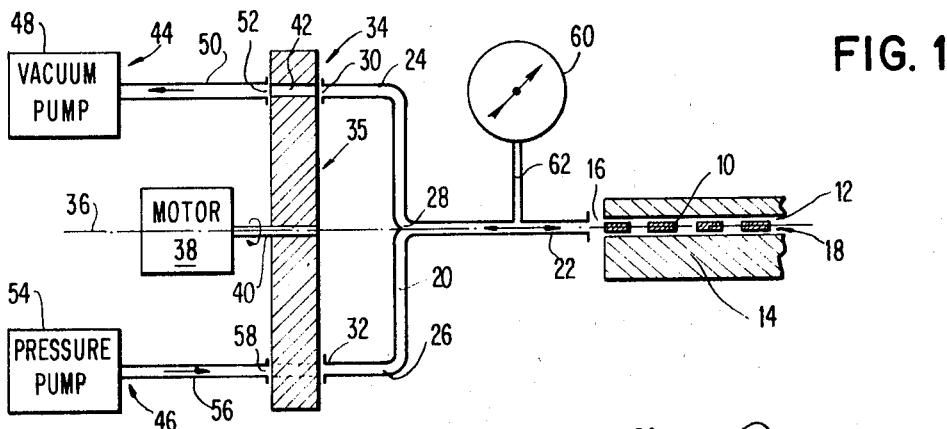
FIG. 1 is a schematic, elevational view of the vibratory fluid transport system of the present invention.

Referring to FIG. 1, a series of articles such as semi-conductor chips 10 are illustrated schematically in FIG. 1 as positioned within a generally fluid confined transport path 12 defined by a cylindrical or rectangular discharge tube 14. The path 12 in this case constitutes the bore of the transfer tube. The ends of the tube are open, as indicated at 16 and 18 respectively, and depending upon the direction of movement of the chips 10 relative to the transfer path, the ends of the tube may act either as a discharge end or an inlet end. In this case, end 16 is in axial alignment with a T-shaped tube assembly 20 including a common outlet tube 22 and a pair of axially displaced, parallel inlet tubes 24 and 26. In this case, inlets 24 and 26 circumferentially spaced 180° from each other and about the axis as defined by the common outlet 22. The down stream sides of inlets 24 and 26 are bent and integrally joined to the common outlet 22 as at 28. The inlet tubes 24 and 26 have their upstream ends 30 and 32 respectively spaced slightly from a disc 34 which is mounted for rotation about its axis 36 which coincides with the axis of the common outlet tube 22 and the axis of transfer tube 14. Further, the axis of the individual inlet tubes 24 and 26 are coincident of the axis 36. The disc 34 is mounted for rotation about the axis on bearings not shown and is coupled to an electric motor 38 or the like via shaft 40, such that the disc 34 rotates about axis 36 in the direction of the arrow. The disc 34 carries a plurality of circumferentially spaced axial holes or openings 42 which are axially in line with the inlet tubes 24 and 26.

On the opposite side of the rotating disc 34 from inlet tubes 24 and 26 are positioned respectively, a vacuum source 44 and a positive pressure source 46. In this respect, the vacuum source 44 may comprise a vacuum pump 48 coupled to a tube 50 whose discharge end 52 is in line with inlet tube 24. Further, the pressure source 46 may comprise a positive pressure pump or compressor 54 discharging into a positive pressure source tube 56, in turn, the discharge end or opening 58 of the same being axially in line with the inlet tube 26. Thus, the disc 34, in rotating, acts as a main component of fluid chopper 35 in that it periodically opens a flow path between the vacuum pump 48, its discharge tube 50, and the axially aligned inlet 24, while 180° circumferentially spaced therefrom the pressure pump is blocked from the axial inlet 26 or in fluid communication therewith via one of the circumferentially spaced axial openings or holes 42 within disc 34. A pressure transducer 60 is fluid coupled by tube 62 to the common outlet tube 22 and thus indicates the vacuum pressure or positive air pressure of the fluid pulses within the common outlet tube 22 which is fluid coupled to the transfer tube 14.

Figure 2:
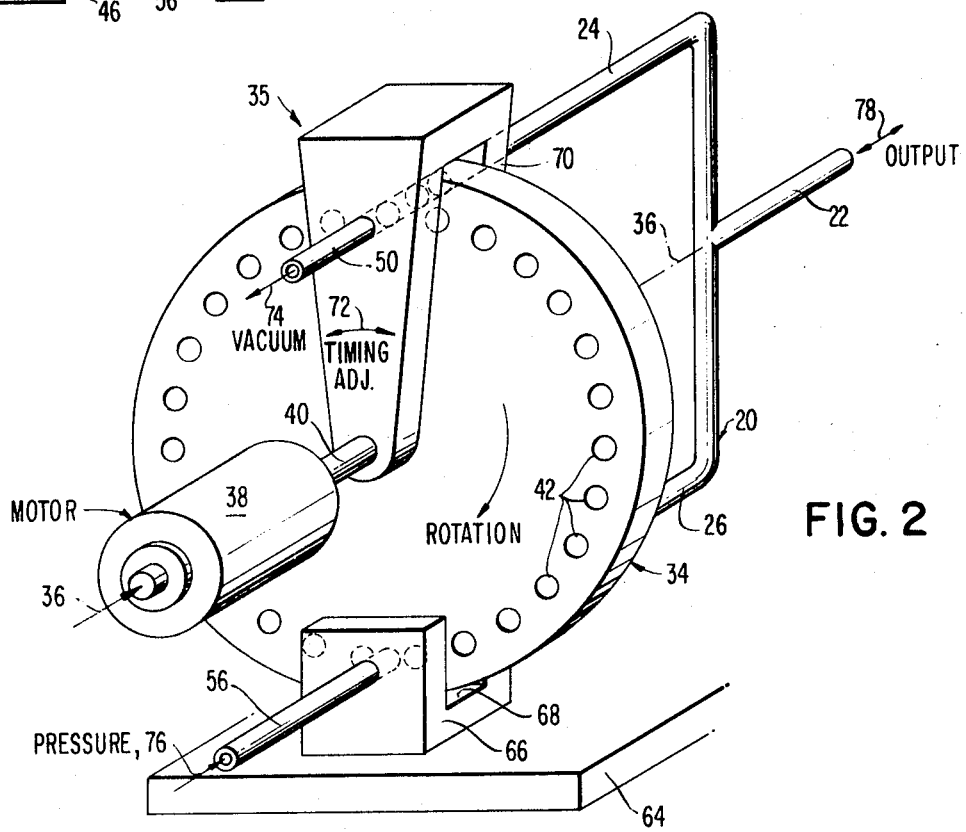
FIG. 2 is a perspective view of the fluid chopper forming a principal component of the transport system of FIG. 1.

The fluid chopper may be best seen by reference to FIG. 2, wherein the base plate 64 supports a U-shaped support member 66 which carries within recess 68 the rotatable disc 34, the disc being shown with a great number of axial openings or holes 42 which extends completely through the axial thickness of the same, the holes being spaced circumferentially and adjacent the periphery of the disc. A second U-shaped support member 70 is mounted on the base plate 64 by means not shown for rotary adjustment about the common axis 36 of the disc 34, the drive motor 38, shaft 40, and the common outlet tube 22 of the tube assembly 20. Shifting of the U-shaped support member 70 about the axis 36 in the direction of the two-headed arrow 72 provides timing adjustment insofar as the delivery of the alternate pulses of either vacuum pressure as indicated by arrow 74 or positive fluid pressure as indicated by arrow 76 to the respective vacuum supply tubes 50 or the positive pressure supply tube 56. The axial alignment of the inlet tube 24 and the vacuum pressure pulse supply tube 50 is easily seen in FIG. 2 and also its relationship to the common outlet tube 22. The fluid output pulses are illustrated as issuing in alternately opposite directions as indicated by double headed arrow 78. Making the drive motor a variable speed motor, results in changing the pulse wave form, an example of which is illustrated in the wave form plot of FIG. 3. Thus, in effect, there is illustrated a perforated disc which is rotated between two air nozzles (tubes 56 and 26) and two vacuum nozzles (tubes 50 and 24) which chops the vacuum air flow and positive air flow into pulses.

The present invention is illustrated in terms of employing a vacuum pump 48 and a positive pressure air pump or compressor 54, although, of course, the control fluid could be liquid if desired. By varying the disc speed, the hole sizes, the number of holes 42 within the rotating disc 34, the magnitude of the vacuum and positive pressures supplied by tubes 50 and 56 to the rotating disc, the vacuum and/or pressure timing as determined by the circumferentially spacing of the holes 42 in conjunction with the axially aligned tubes 24–50 and 26–56, the pulse wave form may be varied until an optimum combination is achieved, depending upon the article being transported and the confined path for the same.

Figure 3:
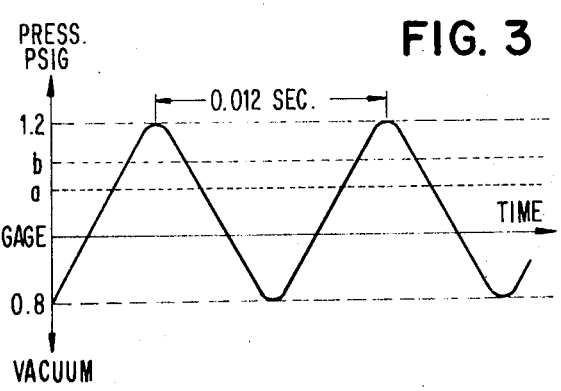
FIG. 3 is a plot of a typical AC wave form for the applied fluid pressure pulses of the pneumatic vibratory transport system of the present invention.

Alternatively, instead of the illustrated motorized chopper, a pure fluid circuit may be used to deliver fluid pulses sequentially in terms of positive pressure and vacuum to the article within the transport path. Regardless of the type of fluid pulse producing devices, a variance both in terms of duration and amplitude of the positive fluid pressure pulses and the vacuum pressure fluid pulses may be readily obtained as illustrated in FIG. 3. In this case, the plot of the fluid pressure constituting the output as identified by the double-headed arrow 78 in FIG. 2, is illustrated as rising from a −0.8 p.s.i.g. vacuum pressure to a positive pressure of 1.2 p.s.i.g. with the positive and negative pressure pulses occurring at a frequency of one positive and one negative pulse every 0.012 seconds. In the plot, line a indicates the level of the pressure required to overcome sliding friction, while the somewhat higher level indicated by line b illustrates the level of the positive or negative pressure required to overcome static friction. In the plot of FIG. 3, since the positive pressure pulses have an amplitude greater than the vacuum pressure pulses, the net result is movement by a fluid vibratory mode of the chips 10 or other articles within the transfer tube 14 in a flow direction from left to right. If the vacuum pressure pulses were of greater magnitude than the positive pressure pulses, the net result would be a movement of the articles under the vibratory mode from right to left, that is, towards the source of fluid pressure pulses. Thus, under the illustrated mode of FIG. 3, the opening 18 of the transfer tube constitutes the discharge end of the fluid transport apparatus while openings 16 constitute the inlet to the same.

Rather than having a constant velocity air stream either in terms of positive pressure or vacuum pressure moving a chip or other article along a transport tube, the present invention meters very high velocity fluid pressure or vacuum for only very short durations. The frequencies of the pulses causes the chips to vibrate and to dislodge themselves if they become bound up in a transfer tube or other limited size transport path. The chips move only in small jumps rather than shooting down the tube in a single thrust. When the air wave is biased to the pressure side, as illustrated in FIG. 3, the articles or chips are fed in one direction, that is, from left to right in the tube, FIG. 1. If the air wave is biased to the vacuum side, the chips feed reversely through the tube. In contrast to conventional air conveyors which use steady state air flow to move the work pieces and which involve mechanical vibrating systems to vibrate the conveyor to produce the desired motion of the work piece, that is, to overcome the static friction, the present invention vibrates the work piece without vibrating the conveyor by in effect vibrating the air acting as a transport force-producing media. This reduces the damage to the especially sensitive semi-conductor chip.

This is different from most air conveyors which use steady state air flow to move the workpieces which involves the problem of isolating the processing equipment from the transport path, which in many cases is impossible to solve. As a result, the damage to chips by conventional handling methods involving mechanical vibration and air conveyors at high speeds is considerable. Considerable yield increases are present through the use of the method and apparatus of the present invention, by alternate vacuum and positive fluid pressure pulsing, preferably to the same side of the article being transported.

What is claimed is:

1. A method of moving an article along a generally fluid confined transport path, comprising:
   alternately applying to the said article positive pressure and vacuum pressure fluid pulses to vibrate the article along said confined path.

2. The method as claimed in claim 1, further comprising the step of varying the amplitude of said applied fluid pulses to vary the velocity of said article.

3. The method as claimed in claim 1, further comprising the step of varying the frequency of the applied fluid pulses to vary the velocity of said article being moved.

4. The method as claimed in claim 1, further comprising the step of varying the duration of said applied fluid pulses to vary the velocity of the article being transported.

5. The method as claimed in claim 1, further comprising the step of maintaining the amplitude of the positive pressure fluid pulses above that of the vacuum pressure fluid pulses to move said article along said confined path in a direction away from that of fluid pulse application.

6. The method as claimed in claim 1, further comprising the step of maintaining the amplitude of said vacuum pressure fluid pulses above that of the positive pressure fluid pulses to vibrate the article along said confined path in a direction toward the source of fluid pulse application.

7. A fluid transport system comprising:
   a generally confined transport path,
   an article positioned within said path for travel along the same, and
   means for applying alternate positive pressure fluid pulses and vacuum pressure fluid pulses to the same side of said article to vibrate the article along said path.

8. The fluid transport system as claimed in claim 7, wherein said means for applying fluid pulses comprises:
   a common fluid outlet coupled to said confined transport path,
   individual fluid inlets fluid coupled to said common outlet and extending parallel to said outlet,
   a disc rotatable about the axis of said common outlet and overlying the open end of each inlet,
   at least one axial opening carried by said disc and movable in line with said inlets during rotation of the same,
   a vacuum source on the side of said disc opposite that of said inlets and axially aligned with one inlet,
   a positive pressure fluid source similarly positioned and axially aligned with said other inlet, and means including said rotating disc for insuring alternate coupling of said vacuum pressure fluid source and said positive pressure fluid source to said common outlet.

9. The fluid transport system as claimed in claim 8, wherein said means for insuring alternate coupling of said vacuum pressure fluid source and said positive pressure fluid source to said common outlet, comprises: circumferential spacing a plurality of axial holes relative to said inlets to effect blocking of said one inlet by said rotating disc while said other inlet is in axial alignment with a disc hole.

10. The fluid transport system as claimed in claim 8, wherein said means for insuring alternate coupling of said vacuum pressure fluid source and said positive pressure fluid source, comprises: means allowing shifting of one of said sources and an axially aligned inlet circumferentially of said axis of rotation of said disc to insure alternate blocking and opening of the same by rotation of the disc in out-of-phase fashion with said other fluid pressure source and inlet.

11. The fluid transport system as claimed in claim 7, further comprising means for varying the amplitude of the fluid pressure pulses in said one inlet relative to the other to determine the direction of movement of the article within said confined fluid transport path.

12. The fluid transport system as claimed in claim 7, further comprising means for varying the duration of the fluid pulses applied to said article to vary the velocity of the article moving along said confined fluid transport path.

13. The fluid transport system as claimed in claim 7, further comprising means for varying the frequency of the fluid pulses applied to said article to vary the velocity of the article moving along said confined fluid transport path.

14. The fluid transport system as claimed in claim 8, further comprising means for varying the amplitude of the fluid pressure pulses in said one inlet relative to the other to determine the direction of movement of the article within said confined fluid transport path.

15. The fluid transport system as claimed in claim 8, further comprising means for varying the duration of the fluid pressure pulses applied to said article to vary the velocity of the article moving along said confined fluid transport path.

16. The fluid transport system as claimed in claim 8, further comprising means for varying the frequency of the fluid pressure pulses applied to said article to vary the velocity of the article moving along said confined fluid transport path.

* * * * *